United States Patent
Gambhir-Parekh

(10) Patent No.: US 9,747,227 B1
(45) Date of Patent: Aug. 29, 2017

(54) METHOD AND SYSTEM FOR TRANSMITTING INFORMATION FROM A NETWORK DEVICE

(71) Applicant: QLOGIC, Corporation, Aliso Viejo, CA (US)

(72) Inventor: Manisha Sameer Gambhir-Parekh, Pune (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 464 days.

(21) Appl. No.: 13/902,453

(22) Filed: May 24, 2013

(51) Int. Cl.
G06F 13/28 (2006.01)

(52) U.S. Cl.
CPC .................................. G06F 13/28 (2013.01)

(58) Field of Classification Search
CPC ....................................................... G06F 13/28
USPC ........................................................... 709/212
See application file for complete search history.

(56) References Cited

U.S. PATENT DOCUMENTS

| | | | |
|---|---|---|---|
| 5,915,092 A * | 6/1999 | Morita | H04L 12/5601 370/395.7 |
| 6,430,628 B1 * | 8/2002 | Connor | G06F 13/28 710/23 |
| 8,725,879 B2 * | 5/2014 | Ajima | H04L 67/14 709/227 |
| 2005/0053060 A1 * | 3/2005 | Pettey | H04L 29/12009 370/385 |
| 2008/0262304 A1 * | 10/2008 | Nisani et al. | 600/118 |
| 2008/0263171 A1 * | 10/2008 | Craft | G06F 13/28 709/212 |
| 2010/0228894 A1 * | 9/2010 | Strulovici | G06F 12/08 710/25 |
| 2011/0004732 A1 * | 1/2011 | Krakirian et al. | 711/147 |
| 2012/0110232 A1 * | 5/2012 | Amitay et al. | 710/308 |
| 2012/0124121 A1 * | 5/2012 | Pope | H04L 49/9094 709/201 |
| 2013/0198538 A1 * | 8/2013 | Diab | G06F 1/3278 713/310 |

* cited by examiner

Primary Examiner — Jerry Dennison
(74) Attorney, Agent, or Firm — Klein, O'Neill & Singh, LLP

(57) ABSTRACT

Method and system for transmitting same data by at least two different ports of a network device coupled to a computing device or to at least two different destinations coupled to a same port of the network device is provided. The computing device sends a single command for sending the same data to the network device. The network device obtains the same data from the computing device via one direct memory access (DMA) operation; and then sends only one notification for transmitting the same data via at least two different ports or to two different destinations via the same port.

24 Claims, 7 Drawing Sheets

| Ethernet Header 402 | FCOE Header 404 | SOF 406 | FC Header 408 | Pay Load 410 | FC CRC 412 | EOF 414 | Ethernet FCS 416 |

400

| Word/Bits | FC Header 408 ||||
|---|---|---|---|---|
| | 31        24 | 23        16 | 15        08 | 07        00 |
| | R_CTL 408C | D_ID | | 408A |
| | CS_CTL 408K | S_ID | | 408B |
| | Type 408J | F_CTL | | 408D |
| | SEQ_ID 408E | DF_CTL 408L | SEQ_CNT | 408F |
| | OX_ID 408G || RX_ID | 408H |
| | Parameter 408M ||||

METHOD AND SYSTEM FOR TRANSMITTING INFORMATION FROM A NETWORK DEVICE

TECHNICAL FIELD

The present disclosure relates to computing systems and devices.

BACKGROUND

A computer network, often referred to simply as a network, is a group of interconnected computing devices that facilitates communication among users and allows users to share resources, for example, storage space at storage devices using a storage area network (SAN). Adapters, switches, and routers (jointly referred to as network devices) may be used to interconnect computing systems, storage devices and others.

Initiators are used to send input/output (I/O) requests for storing or reading data at storage devices that are managed by a computing system, typically referred to as a target controller. An initiator may be an adapter coupled to a computing system that sends out I/O requests for reading or writing data. A target may be an adapter coupled to the target controller that provides a response to the I/O request. Various transport protocols, for example, Fibre Channel, Fibre Channel over Ethernet, iSCSI (Internet over Small Computer System Interface) and others may be used for sending I/O requests. For processing I/O requests, information is typically sent and received by network devices as frames or packets, depending on the protocol used.

In conventional systems, same data may be sent by at least two ports of a network device. To send the same data, a computing system sends two separate commands that are processed twice by the network device. The network device also obtains the same data from the computing system twice using at least two different direct memory access (DMA) operations. This is inefficient and undesirable. The same inefficiency occurs when the port is sending the same data to two different destinations, for example, two servers communicating with the same port. Continuous efforts are being made to efficiently process I/O requests at network devices.

SUMMARY

The various present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a machine implemented method for transmitting the same data by at least two different ports of a network device coupled to a computing device is provided. The method includes receiving a single command from the computing device for sending the same data using the two different ports; obtaining the same data from the computing device via one direct memory access (DMA) operation; and sending only one notification for transmitting the same data to the least two different ports.

In another embodiment, a system having a computing device with a processor executing an application for generating a single command to send the same data using two different ports of a network device coupled to the computing device is provided. The network device obtains the same data from the computing device via one DMA operation; and sends only one notification for transmitting the same data using the two different ports.

In yet another embodiment, a machine implemented method for transmitting the same data to at least two destinations communicating with the same port of a network device coupled to a computing device is provided. The method includes receiving a single command from the computing device to send the same data using the same port; obtaining the same data from the computing device via one direct memory access (DMA) operation; and sending only one notification for transmitting the same data to the two destinations.

This brief summary has been provided so that the nature of the disclosure may be quickly understood. A more complete understanding of the disclosure can be obtained by reference to the following detailed description of the various embodiments thereof concerning the attached drawings.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

Figure 1A:
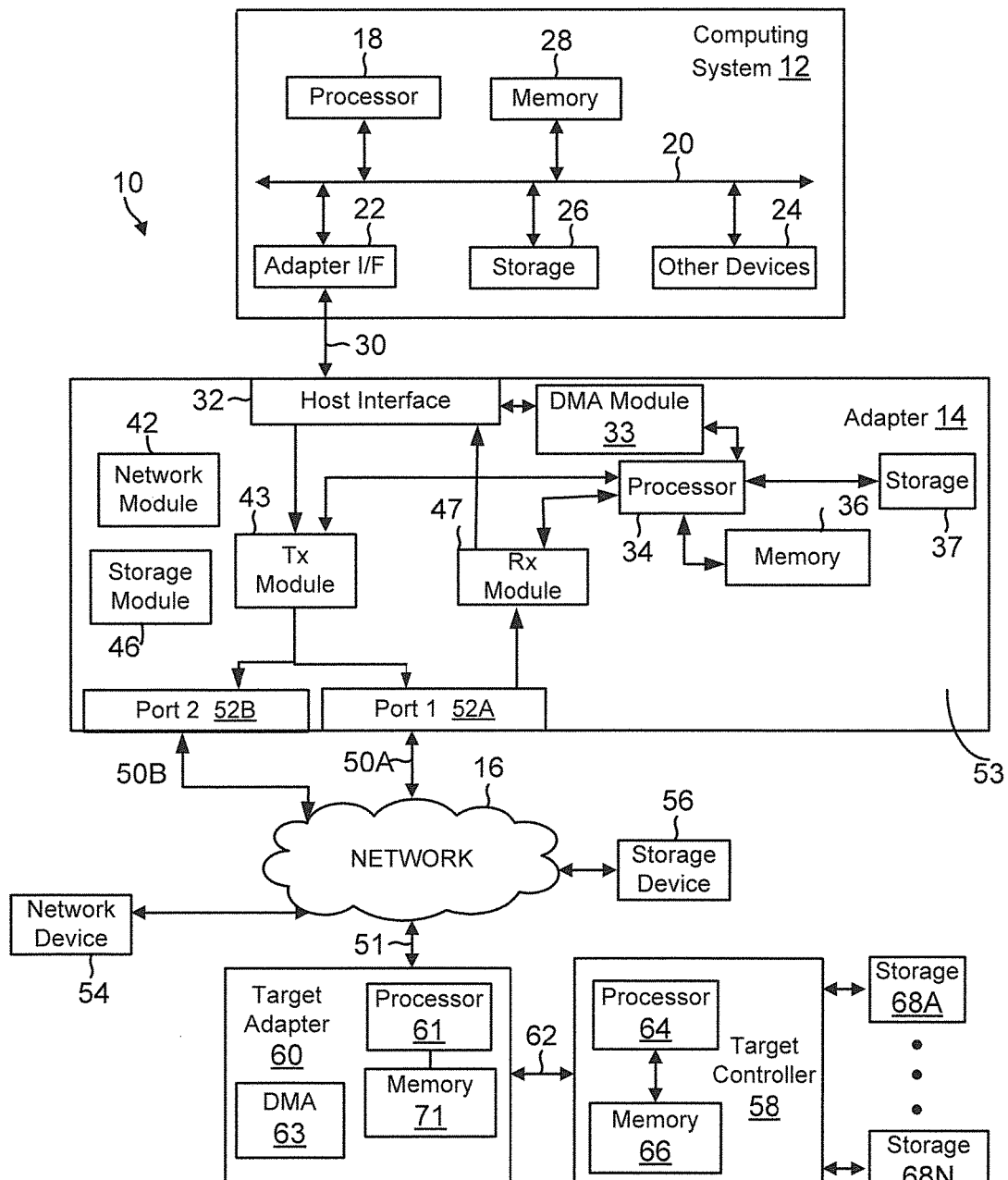
FIG. 1A is a system diagram showing components using the embodiments of the present disclosure.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system" and "functionality," as used herein, generally represent software, firmware, hardware, or a combination of these elements. For instance, in the case of a software implementation, the terms "logic", "module", "component", "system" and "functionality" represent program code that performs specified tasks when executed on a processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, flu and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.). The embodiments disclosed herein may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

System 10: FIG. 1A is a block diagram of a system 10 configured for use with the present embodiments. The system 10 may include one or more computing system 12 (may also be referred to as "host system 12" or server 12) coupled to an adapter 14 (may also be referred to as initiator adapter 14) having a plurality of ports (52A/52B) that interface with a network 16. The network 16 may include, for example, additional computing systems, servers, storage systems, etc.

The computing system 12 may include one or more processors 18, also known as a central processing unit (CPU) coupled to a memory 28 via a computer bus (or interconnect) 20. The processor 18 executes computer-executable process steps out of memory 28. Processor 18 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The computer bus 20 may be, for example, a system bus, a Peripheral Component Interconnect (PCI) bus, PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

Memory 28 provides the processor 18 with access to memory storage. Memory 28 may include random access main memory (RAM). When executing stored computer-executable process steps from a storage device, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

The computing system 12 may further include a local storage device 26, which may be for example a hard disk, a CD-ROM, a non-volatile memory device (flash or memory stick) or any other device. Storage 26 may store operating system program files, application program files, and other files. Some of these files are stored at storage 26 using an installation program. For example, the processor 18 may execute computer-executable process steps of an installation program so that the processor 18 can properly execute the application program. The computing system 12 also includes other devices and interfaces 24, which may include a display device interface, a keyboard interface, a pointing device interface and others.

The adapter 14 may be configured to handle both network and storage traffic. Various network and storage technologies may be used to handle network and storage traffic. Some common protocols and network technologies are described below.

One common network protocol is Ethernet. The original Ethernet bus or star topology was developed for local area networks (LAN) to transfer data at 10 Mbps (megabits per second). Newer Ethernet standards (for example, Fast Ethernet (100 Base-T) and Gigabit Ethernet) support data transfer rates between 100 Mbps and 100 Gbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage networking technology used to access storage systems is called Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_Port establishes a connection to a Fabric element (e.g., a switch) having a fabric port or F_Port.

Fibre Channel over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 14 shown in FIG. 1 may be configured to operate as an FCOE adapter and may be referred to as FCOE adapter 14 or a converged network adapter. The illustrated adapter 14, however, does not limit the scope of the present embodiments. The present embodiments may be practiced with adapters having different configurations.

iSCSI is an IP based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command data blocks (CDBs) to SCSI storage devices (may be referred to as targets) on remote servers. iSCSI is a SAN based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure.

Input/Output (I/O) operations to read data from a storage device and write data to the storage device are typically based on a client/server model. Typically, the client is a host computing system such as a file server that issues a read or a write command for a target using an adapter. The target may be a storage array that responds to the client request.

The following introduces some of the basic terms used during an I/O operation: (a) "Exchange" means the operations needed to perform a data read or write and is uniquely identified by an exchange identifier. An exchange typically includes three operational phases: command phase, data movement phase and response phase. (b) "Initiator"—Typically the client is the initiator that initiates a read or write command. (c) "Target"—Typically a storage array that accepts a read or write command, performs the requested operation.

In a typical I/O exchange, an initiator sends a "read" or "write" command to a target. For a read operation, the target sends the requested data to the initiator. For a write command, the target sends a "Ready to Transfer (XFER_RDY) Protocol Data Unit ("PDU")" informing the initiator that the target is ready to accept the write data. The initiator then sends the write data to the target. Once the data is transferred, the exchange enters the response phase. The target then sends a response PDU to the initiator with the status of the operation. Once the initiator receives this response, the exchange is complete.

With continued reference to FIG. 1A, computing system 12 includes an adapter interface 22 that couples computing system 12 to the adapter 14 via a link 30. The adapter 14 interfaces with the computing system 12 via the link 30 and a host interface 32. In one embodiment, the host interface 32 may be a PCI Express interface coupled to a PCI Express link (for example, 30).

The adapter 14 may include a processor 34 that executes firmware instructions out of memory 36 to control overall adapter 14 operations. Direct memory access (DMA) module 33 may be used by adapter 14 to control access to link 30 for performing DMA operations, e.g. to send data to processor 18 or receive data from processor 18.

The adapter 14 may also include storage 37, which may be for example non-volatile memory, such as flash memory, or any other device. The storage 37 may store executable instructions and operating parameters that can be used for controlling adapter operations.

The adapter 14 includes a network module 42 for handling network traffic via a link 50. In one embodiment, the network module 42 includes logic and circuitry for handling network packets, for example, Ethernet or any other type of network packets.

The adapter 14 may also include a storage module 46 for handling storage traffic to and from storage devices 56 and 68A-68N. In one embodiment, the storage module 46 is configured to process storage traffic according to the Fibre Channel storage protocol, or any other protocol, for example, iSCSI.

The adaptive embodiments of the present disclosure are not limited to adapter 14 having both and separate network and storage modules. For example, adapter 14 may have an integrated module that can handle either network and storage traffic, or adapter 14 may only have a storage module similar to a host bus adapter.

The adapter 14 also includes a plurality of ports, for example, 52A and 52B that interface with a link 50. Ports 52A/52B include logic and circuitry to send and receive information (may be referred to as packets or frames) via the network 16. It is noteworthy that the embodiments disclosed herein are not limited to any particular number of ports.

In one embodiment, adapter 14 includes a transmit (Tx) module 43 for transmitting information from adapter 14 to other devices via link 50. The transmit module 43 may be used by the network module 42 and/or storage module 46. In another embodiment, the storage and network module may have dedicated transmit modules.

The adapter 14 also includes a receive (Rx) module 47 for receiving and processing frames that are received via network link 50. The frames may be received complying with the Fibre Channel protocol, FCoE protocol or any other protocol type that is supported by adapter 14.

Adapter 14 may operate as an "initiator" for sending out I/O requests to a target controller 58 via a target adapter 60. The target adapter 60 is similar to the initiator adapter 14 and includes a processor 61 that has access to memory 71 that may be used to store firmware instructions or any other instruction. Target adapter 60 is coupled to network 16 via a link 51 similar to link 50. Target adapter 60 is coupled to the target controller 58 via a link 62 similar to link 30 described above. Target adapter 60 also includes a DMA module 63 that manages access to link 62 to send and receive data using DMA transfer operations. Target controller 58 may be a computing system similar to computing system 12 having a processor 64 and a memory 66. Target controller 58 manages storage devices 68A-68N for reading and writing data for I/O requests from computing system 12 sent via the initiator adapter 12.

Figure 1B:
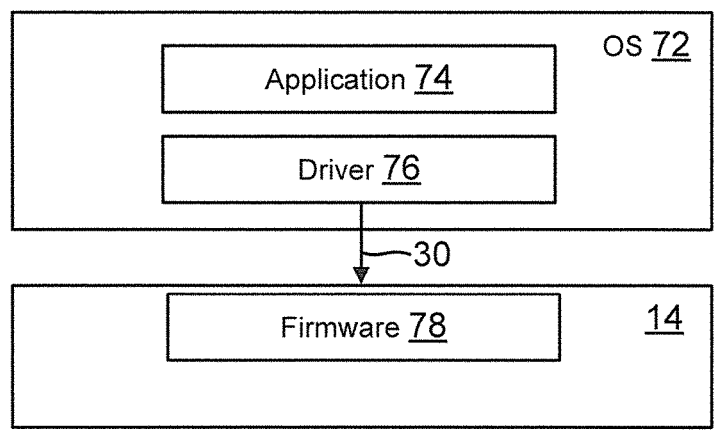
FIG. 1B is a block diagram showing the architecture used by an initiator system, used according to one embodiment.

FIG. 1B shows a block diagram of an architecture that may be used by or with the initiator components of system 10. For example, the architecture of FIG. 1B includes an operating system (OS) 72 that controls the overall operation of computing system 12. OS 72 may be Windows based, Linux based, Solaris based or any other OS type.

Application 74 when executed by computing system 12 may be a client application, for example, a database application, web server, e-mail application, and others. Application 74 may be used to generate a request to read and write information at storage devices 68A-68N.

Application 74 may also be a management application executed by a computing system used as a management console (not shown) for managing the various components in system 10. In one embodiment, application 74 may be used to configure a storage space at storage devices 68A-68N as a logical entity (logical unit number (LUN)). Each LUN is uniquely identified by an identifier (LUN ID) and is associated with physical storage space. A LUN is typically divided into logical block addresses (LBAs) that are used by an application to read and write data to storage locations. The LBAs are mapped with actual physical storage to read and write data. To generate an I/O request to read or write data at a storage location, initiator adapter 14 uses a LUN identifier and a LBA range.

To communicate with adapter 14, application 74 uses a driver 76. The driver may be referred to as an adapter driver. To control the operations of adapter 14, an adapter processor executes firmware instructions 78 out of adapter memory. In one embodiment, some of the process steps may be executed by firmware 78.

Figure 1C:
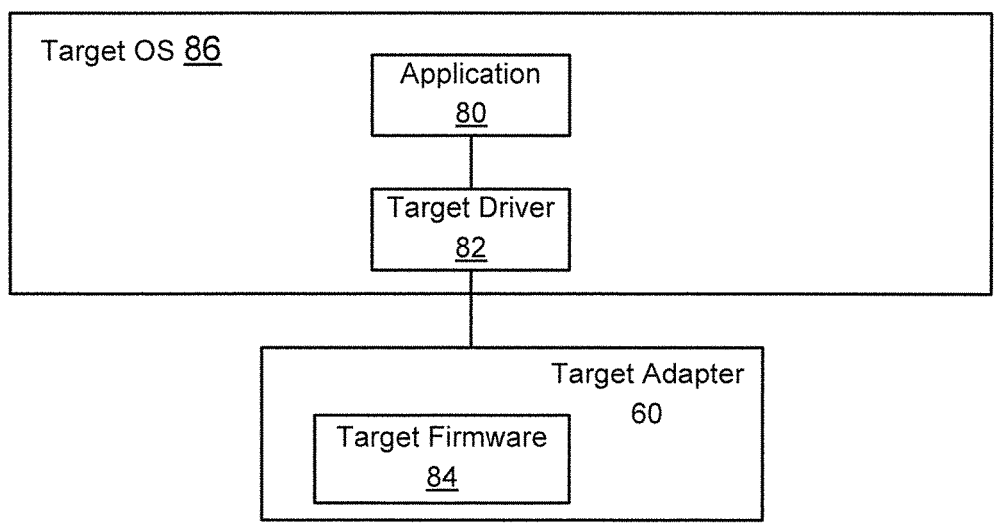
FIG. 1C is a block diagram showing the architecture used by a target system, used according to one embodiment.

FIG. 1C shows a block diagram of an architecture used by the target side of system 10 of FIG. 1A. For example, the architecture of FIG. 1C includes a target operating system 86 similar to 72 that controls the overall operation of target controller 58. OS 72 may be Windows based, Linux based, Solaris based or any other OS type. Target controller 58 may execute an application 80, similar to application 74 that is described above.

To communicate with target adapter 60, application 80 uses a target driver 82, similar to driver 76. To control the operations of target adapter 60, an adapter processor executes firmware instructions 84 (similar to firmware 78) out of target adapter memory. In one embodiment, some of the process steps may be executed by firmware 84.

Data received by adapter 14 from computing system 12 may be mirrored (or replicated) across multiple ports 52A/52B. In conventional systems, when data is to be mirrored across two ports 52A and 52B, processor 18 executing application 74 sends two sets of commands for each port. For each request, the transmit module 43 DMAs the same (or identical) data twice from host memory via link 30. After the same data is sent by ports 52A and 52B, adapter 14 exerts interrupts for each transmission for processor 18. This approach is inefficient and undesirable, as described below with respect to FIG. 2. The system and methods described herein provide an efficient system and process for handling such mirroring operations where the same data is being transmitted by two separate ports.

Figure 1D:
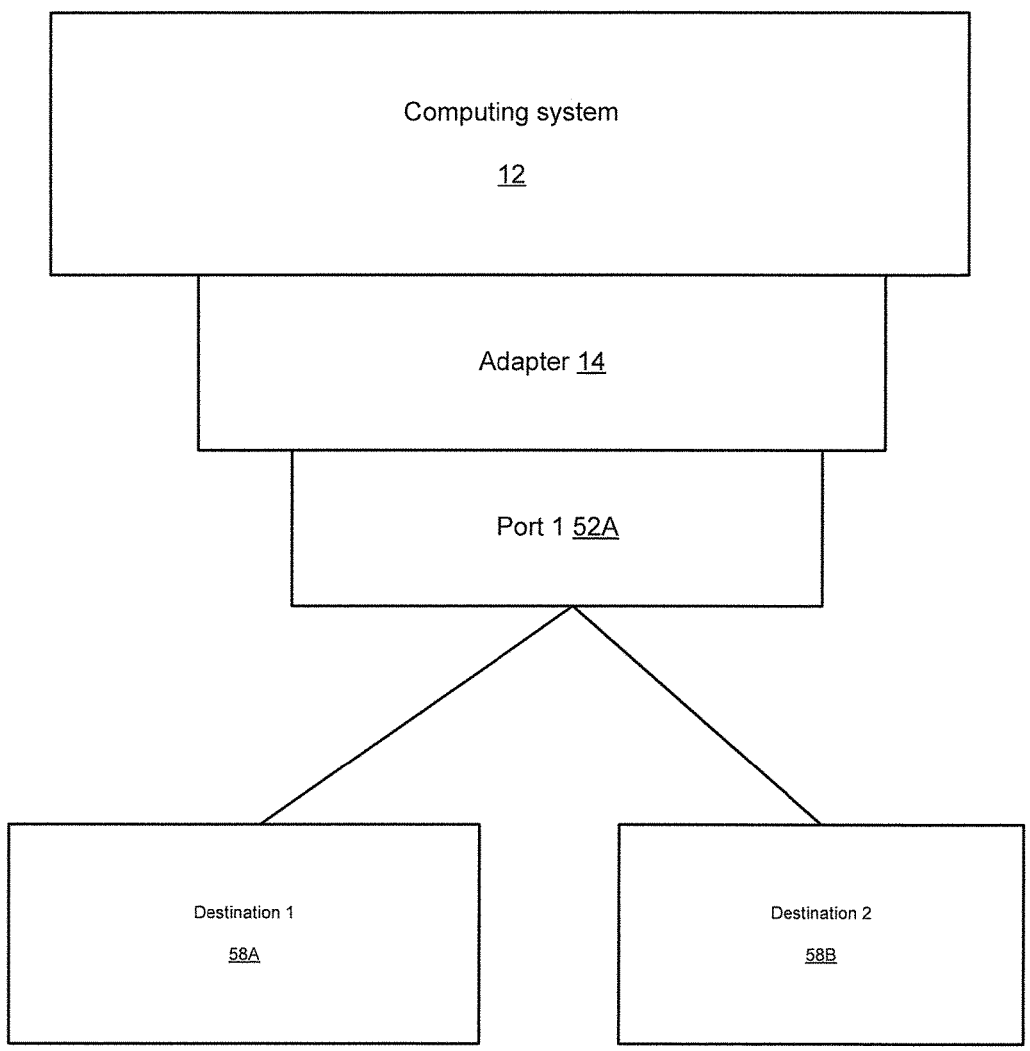
FIG. 1D shows an example of connecting one port to two different destinations.

Similar challenge exists when one port transmits the same data to two separate destinations. This is shown in FIG. 1D, where port 52A sends the same data received from processor 18 to at least two destinations 58A and 58B. As an example, 58A and 58B may be other servers that communicate with or are connected to port 52A. Port 52A sends the same data twice by processing separate commands and then providing interrupts for each command. The process of FIG. 3B provides an efficient technique for transmitting the same data to different destinations, as described below in detail.

Figure 2:
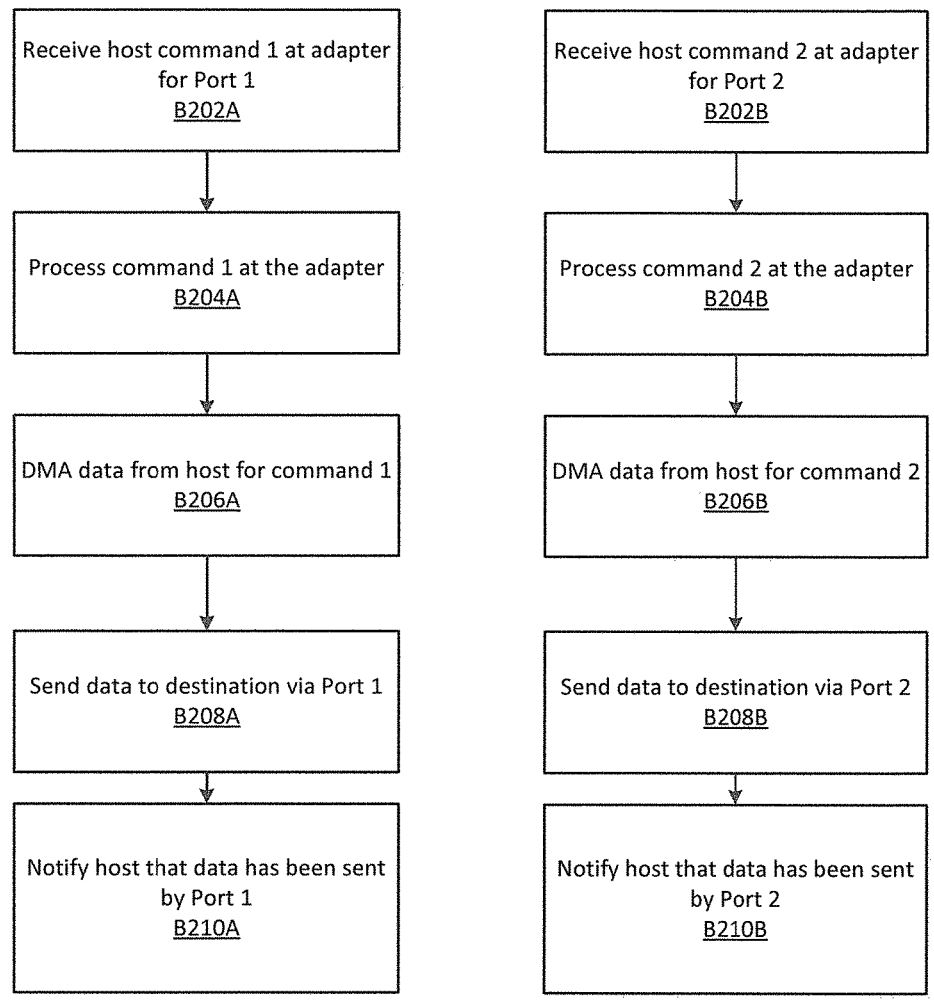
FIG. 2 shows a conventional process for handling commands for sending the same data out via at least two different ports.

FIG. 2 shows a conventional process 200 for sending the same data across at least two ports 52A/52B. The process begins in blocks B202A and B202B, when processor 18 or any other component of computing system 12 sends two separate commands to adapter 14. Adapter 14 then processes the two separate commands in block B204A and B204B. In blocks B206A and B206B, the same data is DMAed twice from computing system 12 via link 30. The data is sent to their destinations by each port in blocks B208A and B208B. Thereafter, in block B210A and B210B, adapter 14 notifies the computing system 12 for each transmission using multiple interrupts.

Figure 3A:
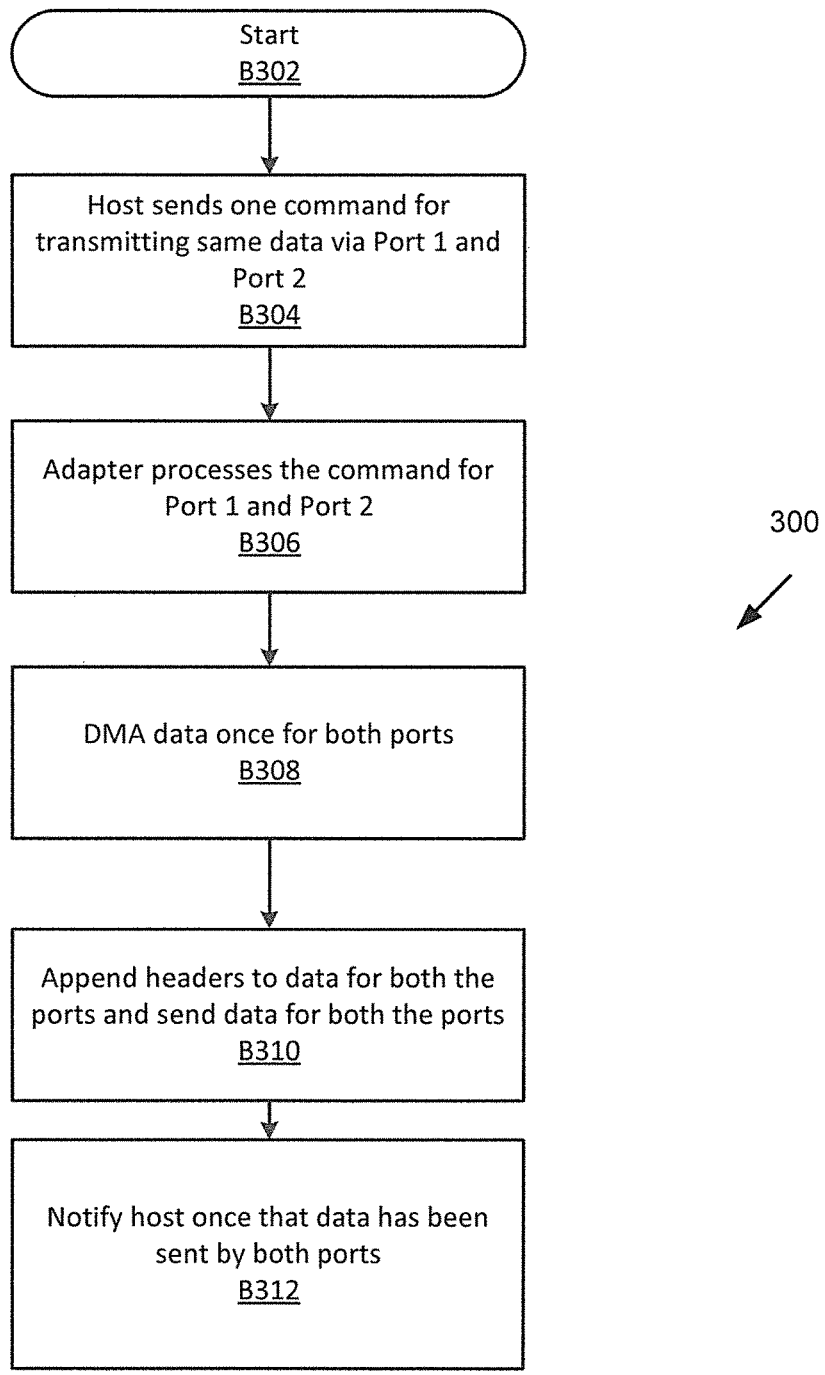
FIGS. 3A-3B show process flow diagrams, according to one embodiment.
Figure 3B:
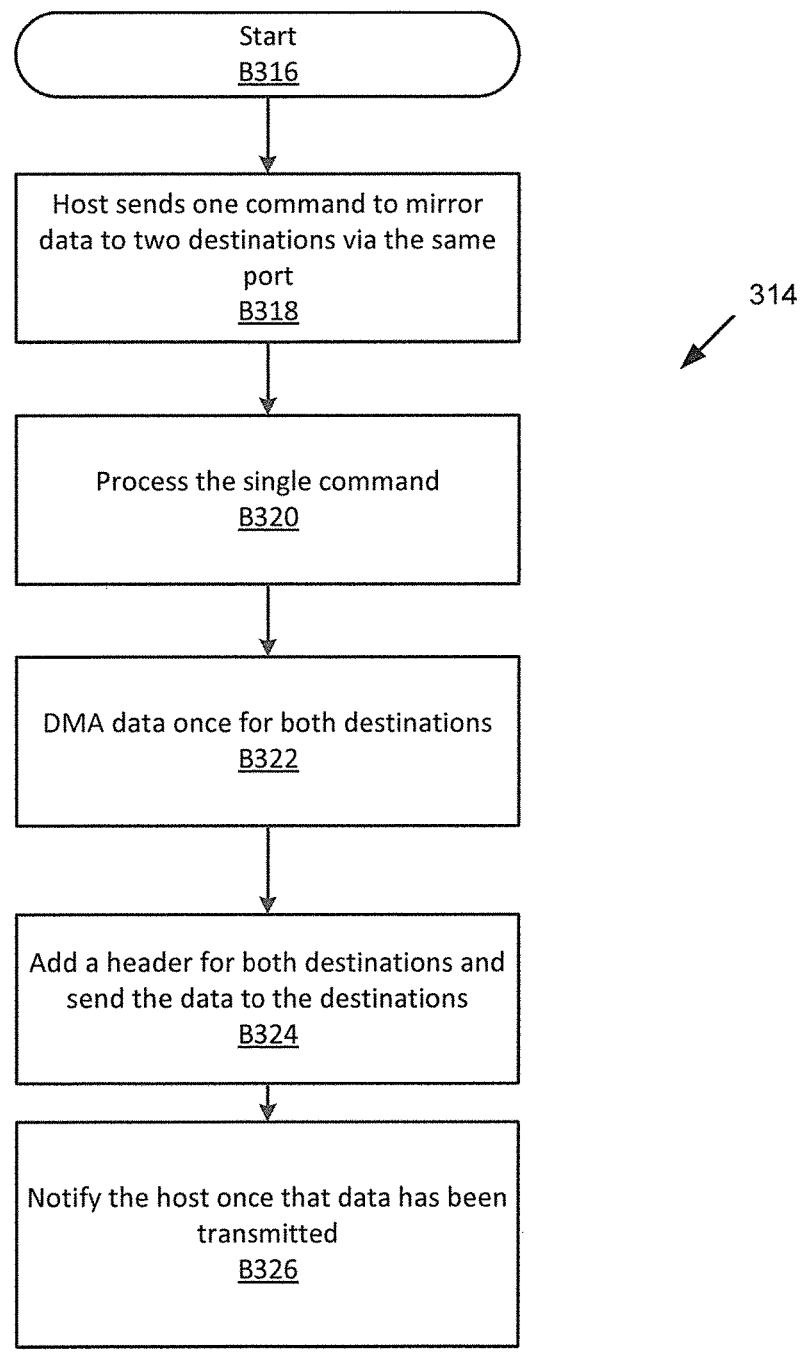

FIG. 3A provides process 300 for overcoming the inefficiencies of the conventional approach of FIG. 2. The process begins in block B302. During this block, computing system 12 is operational with adapter 14 and the plurality of ports of adapter 14 interfacing with network 16.

In block B304, computing system 12 sends one command for transmitting the same data via at least two different ports, for example, 52A and 52B. In one embodiment, the command may be generated by driver 76 that receives requests from application 74. The driver 76 may detect that the same data is being transmitted via different ports. The driver 76 may ascertain that based on an address where data is stored for the command. Driver 76 may also be aware of data replication based on a destination address for a destination where data is to be sent. For example, application 74 may notify driver 76 that any data sent to a particular destination for example, a server A should also be sent to another location, for example, a server B. This information may also be programmed at memory 36 of adapter 14, so that the driver 76 may only have to provide minimal information regarding replication in the command. In another embodiment, application 74 that generates the initial request also generates the single command. Application 74 uses a LBA for a memory location to send the data from and since it is aware of the data location it can generate the single command. Application 74 may also indicate replication based on a destination address, as explained above.

In block B306, the single command is received by adapter 14 via host interface 32 and then processed. The adapter determines that the command is for transmitting data using ports 52A and 52B. The transmit module 43 or processor 34 use the DMA module 33 to generate a request to obtain the data from processor 18. In block B308, only one DMA operation is performed for receiving data from computing system 12 via link 30.

In block B310, the transmit module 43 and/or processor 34 append the proper header for the DMAed data. The data may be staged at the transmit module or any other location. The header type will depend on the protocol used for the transmission, for example, Ethernet, Fibre Channel, FCoE and others.

Once the ports have transmitted all the information, in block B312, adapter 14 notifies computing system 12 that data has been transmitted. In one embodiment, application 74 and/or driver 76 is notified of the transmission using a single notification or an interrupt.

Thus an efficient technique for sending data across at least two ports is provided. Since only one command is processed and the number of DMA operations is reduced, the process can efficiently obtain the data and transmit it. This saves adapter 14 and computing system 12 resources because computing system 12 only has to generate a single command and the adapter 14 only has to process a single command. Furthermore, computing system 12 resources are also saved because only one notification is provided for the transmission by adapter 14.

FIG. 3B shows process 314 to send data for multiple destinations via the same port, according to one embodiment. Process 314 begins in block B316, when the computing system 12, adapter 14 with port 52A and the destinations 58A and 58B are all operational.

In block B318, computing system 12 sends one command for transmitting the same data to destinations 58A and 58B. In one embodiment, the command may be generated by driver 76 that receives requests from application 74. The driver 76 may detect that the same data is being transmitted to two different destinations. The driver 76 may ascertain that based on an address where data is stored for the command. Driver 76 may also be aware of data replication based on a destination address for a destination where data is to be sent. For example, application 74 may notify driver 76 that any data sent to a particular destination for example, a server A should also be sent to another location, for example, a server B. This information may also be programmed at memory 36 of adapter 14, so that the driver 76 may only have to provide minimal information regarding replication in the command. In another embodiment, application 74 that generates the initial request also generates the single command. Application 74 uses a LBA for a memory location to send the data from and since it is aware of the data location it can generate the single command. Application 74 may also indicate replication based on a destination address, as explained above.

In block B320, the single command is received by adapter 14 via host interface 32 and then processed. The adapter determines that the command is for transmitting data via the same port to two different destinations. The transmit module 43 or processor 34 use the DMA module 33 to generate a request to obtain the data from processor 18. In block B322, only one DMA operation is performed for receiving data at the adapter via link 30.

In block B324, the transmit module 43 and/or processor 34 append the proper headers for the same data. The data may be staged at the transmit module or any other location. The header type will depend on the protocol used for the transmission, for example, Ethernet, Fibre Channel, FCoE and others.

Once the port has transmitted all the information, in block B326, adapter 14 notifies computing system 12 that data has been transmitted. In one embodiment, application 74 and/or driver 76 is notified of the transmission.

Thus an efficient technique for sending data to at least two destinations is provided. Since only one command is processed and the number of DMA operations is reduced, the process can efficiently obtain the data and transmit it. This saves adapter 14 and computing system 12 resources because computing system 12 only has to generate a single command and the adapter 14 only has to process a single command. Furthermore, computing system 12 resources are also saved because only one notification is provided for the transmission by adapter 14.

Figures 4A, 4B, 4C:
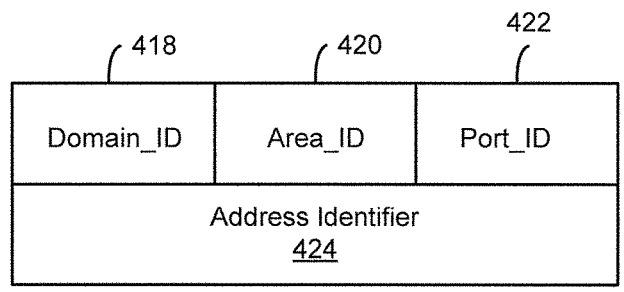
FIGS. 4A-4C show example of frame formats that can be used with the present embodiments.

FIG. 4A shows an example of an FCoE frame (or packet, used interchangeably throughout this specification) format 400 for processing network and storage traffic, according to the present embodiments. The FCoE packet 400 includes an Ethernet header 402. In one embodiment, the Ethernet header 402, which includes the Ethernet type, may be fourteen bytes in length, for example. The Ethernet header may also include optional Tag fields (not shown). The FCoE packet 400 also includes an FCoE header 404 that includes a number of reserved fields. A start of frame (SOF) 406 indicates the beginning of the embedded Fibre Channel frame and may be one byte, for example.

The FCoE packet 400 may also include a Fibre Channel header (FC Header) 408 that may be 24 bytes long with a payload 410. The payload 410 is also referred to herein as the data for a frame. The Fibre Channel cyclic redundancy code (CRC) 512 may be 4 bytes and the Fibre Channel end of frame (EOF) 414 may be 1 byte in size. The EOF 414 indicates the end of the embedded Fibre Channel frame. The Ethernet FCS 416 is inserted after the Fibre Channel EOF 414. The EOF may be referred to herein as a trailer.

FIG. 4B shows a standard 24-bit Fibre Channel address identifier 424. The address identifier 424 includes a Domain_ID 418, an Area_ID 420, and a Port_ID 422. The Domain_ID 418 is a Domain identifier based on the upper 8-bits of the 24-bit Fibre Channel address. A Domain includes one or more Fibre Channel switches that has the same Domain_ID for all N_Ports and NL_Ports within or attached to the switches. If there is more than one switch in the Domain, then each switch within the Domain is directly connected via an Inter-Switch Link to at least one other switch in the same Domain.

The Area_ID 420 is an Area identifier based on the middle 8 bits of the 24-bit Fibre Channel address. The Area_ID 420 applies either to (a) one or more N_Ports within and attached to a Fibre Channel switch, or (b) to an Arbitrated Loop of NL_Ports attached to a single FL_Port.

The Port_ID 422 is the lower 8-bits of a Fibre Channel address. The Port_ID 422 applies to both (a) a single N_Port address and virtualized N_Port within a Domain/Area and (b) the valid AL_PA of a single NL_Port or FL_Port on an Arbitrated Loop.

FIG. 4C shows an example of the FC header 408 of FIG. 4A. The following frame header fields that may be used in the present methods are:

D_ID 408A—A 24-bit Fibre Channel frame header field that contains the destination address for a frame.

S_ID 408B—A 24-bit Fibre Channel frame header field that contains the source address for a frame.

R_CTL 408C—A routing control flag in a Fibre Channel header.

F_CTL 408D—A frame control flag.

SEQ_ID 408E—Provides a sequence number for a frame of an exchange.

SEQ_CNT 408F—Provides the number of frames that have been transmitted in a sequence.

OX_ID 408G: This is an originator exchange identifier that is assigned by an initiator.

RX_ID 408H—This is an exchange identifier that is generated by a target.

CS_CTL 408J—This bit is used to provide quality of service.

Type 408K—This field is used to indicate a payload. For example, a value of 0x08 indicates a SCSI-FCP payload.

DF_CTL 408L—This is field is used to indicate presence of optional headers and their size.

Parameter 408M—This is typically used to provide a relative offset in a sequence.

It is noteworthy that although the embodiments described above are based on initiator and target adapters, the adaptive embodiments can be used by any network device, for example, a switch port or other similar devices.

Although the present disclosure has been described with reference to specific embodiments, these embodiments are illustrative only and not limiting. For example, although the description above has been described with respect to an adapter, any other device may be configured to perform the foregoing function. Thus the term adapter and device are interchangeable. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A machine implemented method for transmitting data to one or more destinations of a networked system by at least two different ports of a network device coupled to a computing device and interfacing with the one or more destinations using a network link, comprising:

generating by an application executed by the computing device, a plurality of requests to transmit data by the network device;

receiving the plurality of requests by a processor executable driver executed by the computing device for interfacing with the network device;

detecting by the driver, based on the plurality of requests, that the data to be transmitted by at least two different ports of the network device is same data;

generating by the driver, based on the plurality of
  requests, a single command commanding the network
  device to transmit the same data using the at least two
  different ports of the network device;
receiving the single command by the network device from
  the computing device for transmitting the same data, as
  determined by the driver, using the at least two different
  ports;
obtaining, by the network device, in response to the single
  command, the same data from the computing device
  via one direct memory access (DMA) operation;
appending, by the network device, in response to the
  single command, a header for transmitting the same
  data twice by the at least two different ports;
transmitting, in response to the single command, the same
  data twice by the at least two different ports with the
  appended header; and
sending, by the network device, only one notification to
  the computing device after transmitting the same data
  twice by the at least two different ports via the network
  link, wherein the network device notifies the driver
  after the same data is transmitted.

2. The method of claim 1, wherein the same data is transmitted using a Fibre Channel protocol.

3. The method of claim 1, wherein the same data is transmitted using a Fibre Channel over Ethernet protocol.

4. The method of claim 1, wherein the network device is a Fibre Channel over Ethernet adapter, an iSCSI or a Fibre Channel adapter.

5. The method of claim 1, wherein the network device is an adapter having a transmit module that processes the single command.

6. The method of claim 5, wherein the transmit module initiates the single DMA operation for getting the same data from the computing device.

7. The method of claim 1, wherein the driver detects that the same data is being transmitted based on a logical block address where the same data is stored, the logical block address provided by the application to the driver.

8. The method of claim 1, wherein instead of the driver, the application generates the single command for the driver and the driver sends the single command to the network device.

9. A non-transitory, machine readable storage medium having stored thereon instructions for performing a method for transmitting data to one or more destinations of a networked system by at least two different ports of a network device coupled to a computing device and interfacing with the one or more destinations using a network link, comprising machine executable code which when executed by at least one machine, causes the machine to:
  generate by an application executed by the computing
    device, a plurality of requests to transmit data by the
    network device;
  receive the plurality of requests by a processor executable
    driver executed by the computing device for interfacing
    with the network device;
  detect by the driver, based on the plurality of requests, that
    the data to be transmitted by at least two different ports
    of the network device is same data;
  generate by the driver, based on the plurality of requests,
    a single command commanding the network device to
    transmit the same data using the at least two different
    ports of the network device;
  receive the single command by the network device from
    the computing device for transmitting the same data, as
    determined by the driver, using the at least two different
    ports;
  obtain, by the network device, in response to the single
    command, the same data from the computing device
    via one direct memory access (DMA) operation;
  append, by the network device, in response to the single
    command, a header for transmitting the same data
    twice by the at least two different ports;
  transmit, in response to the single command, the same
    data twice by the at least two different ports with the
    appended header; and
  send, by the network device, only one notification to the
    computing device after transmitting the same data
    twice by the at least two different ports via the network
    link, wherein the network device notifies the driver
    after the same data is transmitted.

10. The non-transitory machine readable medium of claim 9, wherein the same data is transmitted using a Fibre Channel protocol.

11. The non-transitory machine readable medium of claim 9, wherein the same data is transmitted using a Fibre Channel over Ethernet protocol.

12. The non-transitory machine readable medium of claim 9, wherein the network device is a Fibre Channel over Ethernet adapter, an iSCSI or a Fibre Channel adapter.

13. The non-transitory machine readable medium of claim 9, wherein the network device is an adapter having a transmit module that processes the single command.

14. The non-transitory machine readable medium of claim 13, wherein the transmit module initiates the single DMA operation for getting the same data from the computing device.

15. The non-transitory machine readable medium of claim 9, wherein the driver detects that the same data is being transmitted based on an address where the same data is stored, the address provided by the application to the driver.

16. The non-transitory machine readable medium of claim 9, wherein instead of the driver, the application generates the single command for the driver and the driver sends the single command to the network device.

17. A machine implemented method for transmitting data to one or more destinations of a networked system by at least two different ports of a network device coupled to a computing device and interfacing with the one or more destinations using a network link, comprising:
  generating by an application executed by the computing
    device, a plurality of requests to transmit data by the
    network device to more than one destination by the at
    least two different ports;
  determining by the application that the data to be transmitted by the at least two different ports is same data;
  generating by the application, based on the plurality of
    requests, a single command commanding the network
    device to transmit the same data using the at least two
    different ports;
  receiving the single command by the network device from
    the computing device for transmitting the same data,
    using the at least two different ports;
  obtaining, by the network device, in response to the single
    command, the same data from the computing device
    via one direct memory access (DMA) operation;
  appending, by the network device, in response to the
    single command, a header for transmitting the same
    data twice by the at least two different ports;

transmitting, in response to the single command, the same data twice by the at least two different ports with the appended header; and sending, by the network device, only one notification to the computing device after transmitting the same data twice by the at least two different ports via the network link.

18. The method of claim 17, wherein the same data is transmitted using a Fibre Channel protocol.

19. The method of claim 17, wherein the same data is transmitted using a Fibre Channel over Ethernet protocol.

20. The method of claim 17, wherein the network device is a Fibre Channel over Ethernet adapter, an iSCSI or a Fibre Channel adapter.

21. The method of claim 17, wherein the network device is an adapter having a transmit module that processes the single command.

22. The method of claim 21, wherein the transmit module initiates the single DMA operation for getting the same data from the computing device.

23. The method of claim 17, wherein the application detects that the same data is being transmitted based on a logical block address (LBA) of where the same data is stored.

24. The method of claim 17, wherein the network device notifies a driver after the same data is transmitted.

* * * * *

UNITED STATES PATENT AND TRADEMARK OFFICE
CERTIFICATE OF CORRECTION

PATENT NO. : 9,747,227 B1
APPLICATION NO. : 13/902453
DATED : August 29, 2017
INVENTOR(S) : Manisha Sameer Gambhir-Parekh It is certified that error appears in the above-identified patent and that said Letters Patent is hereby corrected as shown below:

In Column 3, Line 7, delete "flu" and insert -- firmware, --, therefor.

Signed and Sealed this
Twenty-fourth Day of April, 2018

Andrei Iancu
*Director of the United States Patent and Trademark Office*